(12) United States Patent
Nies

(10) Patent No.: US 8,226,342 B2
(45) Date of Patent: Jul. 24, 2012

(54) TRANSPORT DEVICE FOR AN ELONGATE OBJECT SUCH AS A ROTOR BLADE FOR A WIND TURBINE OR THE LIKE

(75) Inventor: Jacob Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 1180 days.

(21) Appl. No.: 11/271,265

(22) Filed: Nov. 10, 2005

(65) Prior Publication Data

US 2006/0113449 A1 Jun. 1, 2006

(30) Foreign Application Priority Data

Nov. 18, 2004 (EP) .................................. 04027374

(51) Int. Cl.
*B65F 9/00* (2006.01)
(52) U.S. Cl. .................................................... 414/350
(58) Field of Classification Search .................. 414/350, 414/267, 469, 474, 475
See application file for complete search history.

(56) References Cited

U.S. PATENT DOCUMENTS

| | | | | |
|---|---|---|---|---|
| 2,043,507 A | * | 6/1936 | Culemeyer | 414/467 |
| 3,618,801 A | * | 11/1971 | Blanchard | 414/483 |
| 3,901,397 A | * | 8/1975 | Brock | 414/459 |
| 4,017,094 A | | 4/1977 | Pilcher et al. | |
| 4,344,731 A | * | 8/1982 | Visa et al. | 414/471 |
| 4,417,841 A | * | 11/1983 | Chadwick | 414/346 |
| 5,017,081 A | | 5/1991 | Helton et al. | |
| 5,026,228 A | * | 6/1991 | Mansfield | 410/52 |
| 5,687,981 A | * | 11/1997 | George et al. | 280/405.1 |
| 6,431,576 B1 | * | 8/2002 | Viaud et al. | 280/442 |
| 6,688,834 B1 | * | 2/2004 | Aulick | 414/469 |

FOREIGN PATENT DOCUMENTS

| | | |
|---|---|---|
| CA | 1083537 A1 | 8/1980 |
| WO | WO 2005005286 A1 * | 1/2005 |

\* cited by examiner

*Primary Examiner* — Joshua Rudawitz

(57) ABSTRACT

The transport device for an elongate object, e.g. for a rotor blade for a wind turbine, comprises a support surface for the elongate object, comprising a front end and a rear end, means for pivoting the elongate object from a substantially horizontal orientation into at least one inclined orientation arranged obliquely relative to the substantially horizontal orientation, and means for changing the distance between the ends of the support surface as viewed in the vertical projection of the support surface, wherein, if the elongate object is arranged in the substantially horizontal orientation, the ends of the support surface are spaced apart a first distance value, and, if the elongate object is arranged in the at least one inclined orientation, the ends of the support surface are spaced apart a second distance value which is smaller than the first distance value.

6 Claims, 3 Drawing Sheets

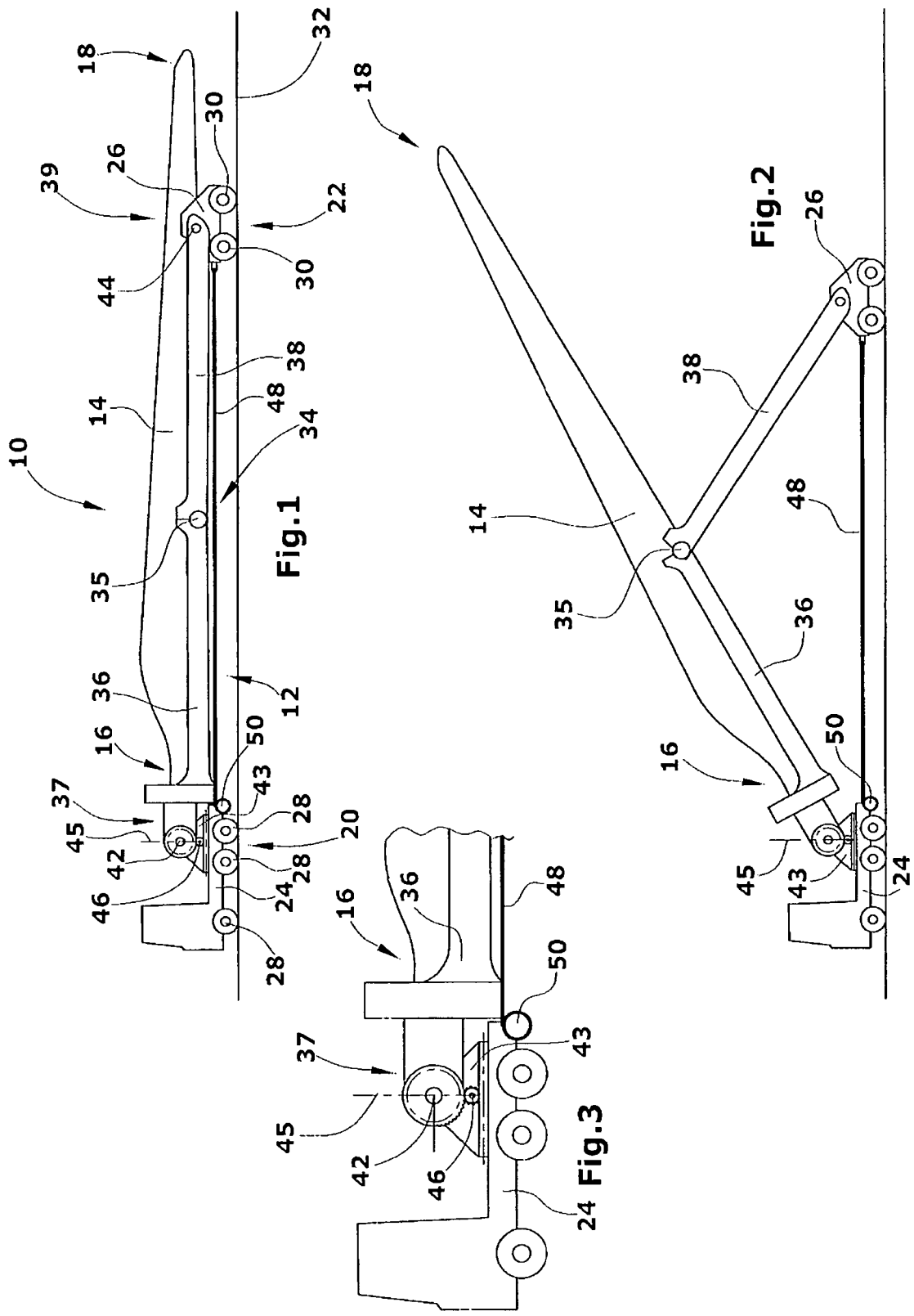

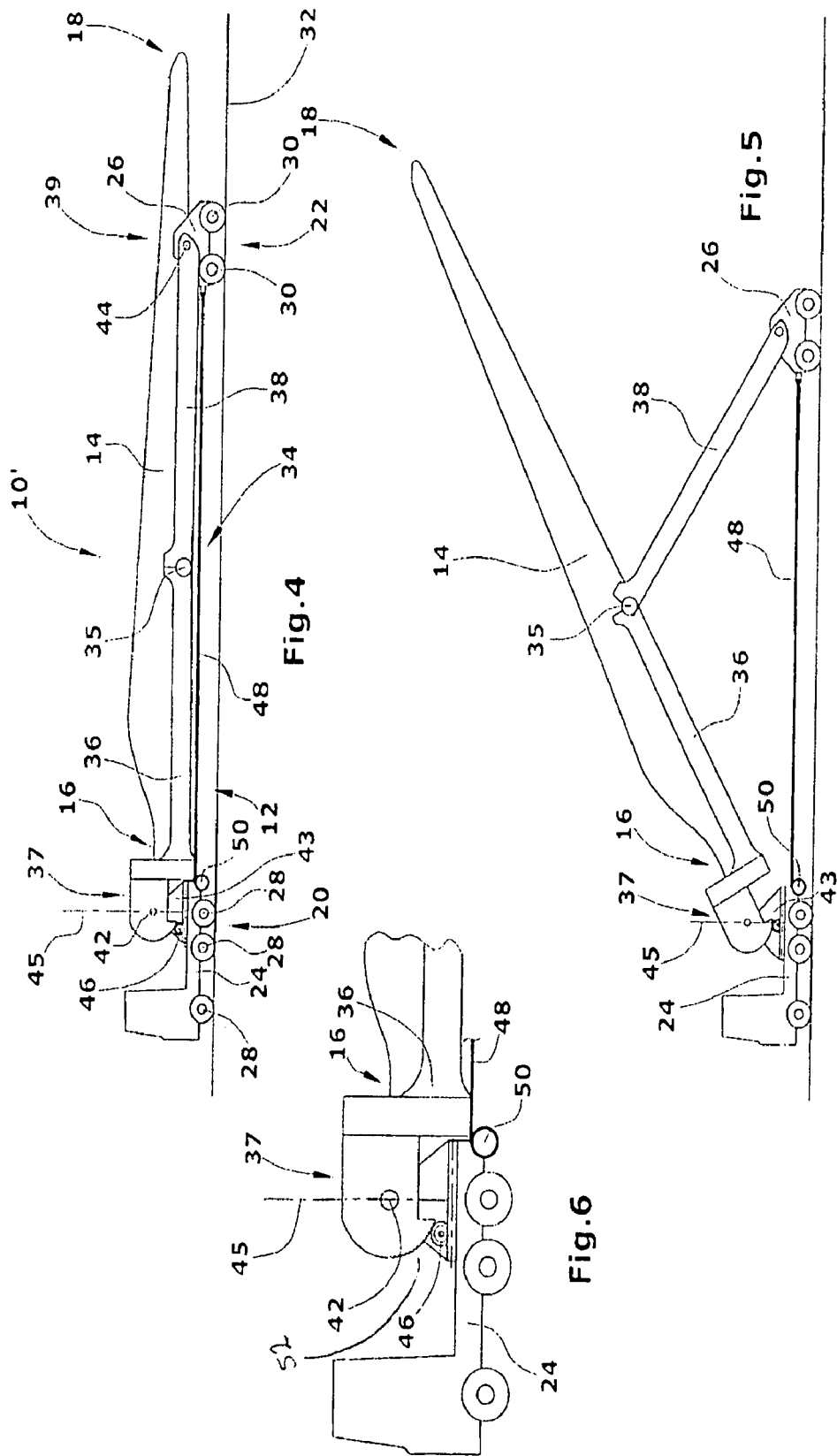

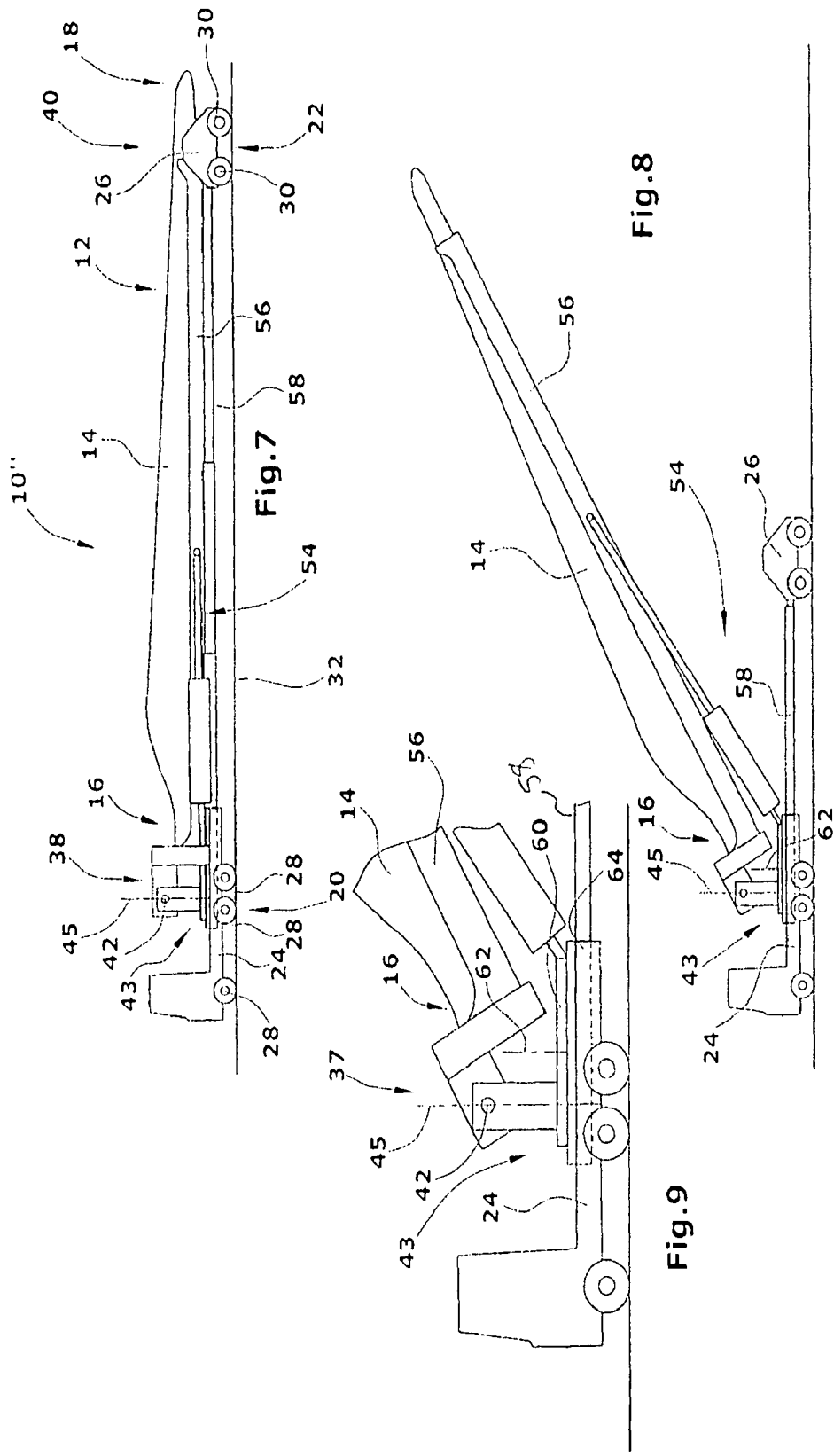

TRANSPORT DEVICE FOR AN ELONGATE OBJECT SUCH AS A ROTOR BLADE FOR A WIND TURBINE OR THE LIKE

The present application claims priority to corresponding EP Application No. 04027374.0, filed on Nov. 18, 2004, the entire contents of which are hereby incorporated by reference.

BACKGROUND OF THE INVENTION

1. Field of the Invention

The present invention relates to a transport device for an elongate object and, in particular, to a transport device for a rotor blade for a wind turbine.

2. Related Prior Art

Transporting elongate objects along a road or over ground can be difficult in particular in narrow road corners having relatively small radii. The longer the object to be transported the larger has to be the minimum radius of a road corner around which the object has to be transported. In other words, the curves along a road limits the maximum length of an elongate object to be transported along the road. As an alternative, an elongate object can also be transported off road. However, this causes additional difficulties in particular regarding the unevenness of an off-road ground.

U.S. Pat. Nos. 4,017,094 and 5,017,081 both describe transportation trailers the length of which is adjustable. A truck for handling harvested trees is known from CA-A-1 083 537.

Typically, the rotor blades of a wind energy turbine are transported by use of a transport device which moves or which is moved over the ground and, in particular, along a road. Since the diameters of the rotor of modern wind energy turbines increase in order to improve the efficiency of the wind energy turbine, the individual rotor blades became longer and longer, which in turn results in difficulties with respect to the need to transport a rotor blade along and around road corners. Accordingly, there is a need for a transport device for an elongate object which length is substantially independent from the degree of curvature of the road or route to be used for the transport.

SUMMARY OF THE INVENTION

Embodiments of the present invention includes a transport device of an elongate object, e.g. for a rotor blade for a wind turbine, comprising
  a support surface for the elongate object, comprising a front end and a rear end,
  means for pivoting the elongate object from a substantially horizontal orientation into at least one inclined orientation arranged obliquely relative to the substantially horizontal orientation, and
  means for changing the distance between the ends of the support surface as viewed in the vertical projection of the support surface, wherein, if the elongate object is arranged in the substantially horizontal orientation, the ends of the support surface are spaced apart a first distance value and, if the elongate object is arranged in the at least one inclined orientation, the ends of the support surface are spaced apart a second distance value which is smaller than the first distance value.

According to one embodiment of the present invention the transport device for transporting an elongate object such as a rotor blade for a wind energy turbine, comprises a support surface having a front end and a rear end. The support surface supports the elongate object substantially along its extension and, in particular, at least at the ends of the elongate object when the same is in its substantially horizontal orientation. In this orientation, the elongate object can be transported over the ground wherein the horizontal orientation is stabilized due to the support by the support surface at the front and rear ends of the elongate object and, preferably due to the support of the elongate object along its length. The transport device according to one embodiment of the invention comprises a means for elevating the elongate object from the substantially horizontal orientation into at least one inclined orientation positioned obliquely relative to the substantially horizontal orientation. By pivoting the elongate object around a substantially horizontal axis for elevating the object, its extension when viewed in the vertical projection is reduced. Accordingly, in an inclined orientation, the elongate object can be transported easier along narrow road corners or bent sections of the transport route. However, also the extension of the support surface for the elongate object has to be reduced when the elongate object is in an inclined orientation so as to use the advantages of the reduced overall length of the transport device when viewed in the vertical projection.

Therefore, according to one embodiment of the present invention, the transport device comprises a means for changing the distance between the ends of the support surface when viewed in the vertical projection, wherein, if the elongate object is arranged in the substantially horizontal orientation, the ends of the support surface are spaced apart at a first distance value, and, if the elongate object is arranged in an inclined orientation, the ends of the support surface are spaced apart at a second distance value which is smaller than the first distance value.

The transport device according to one embodiment of the present invention can be used for transporting the elongate object when oriented substantially horizontally, which will be the normal transport orientation of the elongate object. In the substantially horizontal orientation the elongate object is stably supported by the support surface because the support surface supports the elongate object at least at its front and rear ends. Typically, the support surface also supports the elongate object between its ends. By reducing the overall length of the support surface it is possible to manoeuvre the transport device around bent portions of the transport route such as around narrow road corners. In order to reduce the length of the elongate object when viewed in the vertical projection, the transport device according to the invention comprises a means for pivoting the elongate object from the substantially horizontal orientation into at least one inclined orientation. In the inclined orientation the overall length of the elongate object is reduced when viewed in the vertical projection.

Elevating the elongate object can be provided by pivoting a portion of the support surface around a substantially horizontal axis to which portion the elongate object is fixed. For enhancing manoeuvring the elongate object, in the inclined orientation of the elongate object or the elevatable portion of the support surface, the portion or the elongate object is pivotable around a substantially vertical axis.

According to one embodiment of the present invention, the means for changing the distance between the ends of the support surface comprise an elbow lever arranged to be bent about a substantially horizontal axis and including two lever arms articulated to each other. The two lever arms at least partially form the support surface for the elongate object. The two mutually remote ends of the lever arms form the ends of the support surface. In this embodiment of the present invention, the elongate object is attachable to one of the ends of the lever arms and in all positions of the elbow lever is supported by the respective lever arm. Moreover, according to this embodiment of the present invention, the means for pivoting the elongate object are arranged to act on the elbow lever for changing the elbow lever orientation.

According to a further embodiment of the present invention, the front and rear ends of the support surface can be secured against unintentional movements preferably away from each other when the two lever arms of the elbow lever are articulated to each other. The securing means can be for example a length-variable connection element such as a winch and a wire, chain, or rope operated by the winch. Also a telescopic length-variable connection element can be used.

In another embodiment of the present invention, the support surface comprises a first portion arranged to be pivoted about a substantially horizontal axis for elevating the elongate object. The first portion extends from the front end up to near the rear end of the support surface. The means for pivoting the elongate object are arranged to act on the first portion of the support surface for pivoting the first portion. A length-variable connection element is arranged below the first portion of the support surface for connecting the rear end of the support surface to the front end thereof while the means for changing the distance between the ends of the support surface is arranged to act on the length-variable connection element connected to the rear end of the support surface. By this arrangement it is possible to reduce the extension of the support surface i.e. the distance between the front and rear ends thereof. The elongate object is mountable at the front end of the support surface and in its substantially horizontal orientation is supported at its rear end by the rear end of the support surface or by a portion of the support surface between the front and rear ends thereof. In its elevated orientation, the elongate object is supported by the first portion of the support surface which can be pivoted about a substantially horizontal axis.

According to a further embodiment of the present invention, the rear end of the support surface has an undercarriage with wheels arranged thereon. Typically, these wheels are steerable in order to further improve the manoeuvrability of the transport device around narrow road corners. Moreover, the transport device according to one embodiment of the present invention in preferred embodiment thereof includes the possibility to rotate the elongate object around its axis when supported by the support surface. Such a mechanism is disclosed e.g. in WO 03/057528 A1.

BRIEF DESCRIPTION OF THE DRAWINGS

A full and enabling disclosure of the present invention, including the best mode thereof, to one of ordinary skilled in the art, is set forth more particularly in the remainder of the specification, including reference to the accompanying drawings in which FIG. 1 is a side view of a transport device for a rotor blade for a wind energy turbine according to a first embodiment with the rotor blade in its substantially horizontal orientation, FIG. 2 is a side view of the transport device of FIG. 1 with the rotor blade is transported in an elevated position, i.e. in an inclined orientation, FIG. 3 is a enlarged side view of the front end of the transport device of FIG. 1, FIG. 4 is a side view of a transport device for a rotor blade for a wind energy turbine according to a second embodiment with the rotor blade in its substantially horizontal orientation, FIG. 5 is a side view of the transport device of FIG. 4 with the rotor blade being transported in an elevated position, i.e. in an inclined orientation, FIG. 6 is a enlarged side view of the front end of the transport device of FIG. 4, FIG. 7 is a side view of a transport device for a rotor blade for a wind energy turbine according to a third embodiment with the rotor blade in its substantially horizontal orientation, FIG. 8 is a side view of the transport device of FIG. 7 with the rotor blade is transported in an elevated position, i.e. in an inclined orientation, FIG. 9 is an enlarged side view of the front end of the transport device of FIG. 7.

DESCRIPTION OF PREFERRED EMBODIMENTS

FIGS. 1 to 3 show individual side views of a transport device 10 for transporting an elongate object such as a wind energy turbine rotor blade according to a first embodiment. The transport device 10 includes a support surface 12 for supporting the rotor blade 14 between its front end 16 and its rear end 18 or tip. When mounted at a wind energy turbine, the front end 16 of the rotor blade 14 is attached to the rotor hub (not shown). At its front and rear ends 20,22 the support surface 12 is provided with undercarriages 24,26 provided with wheels 28,30 for moving the transport device 10 over the ground 32. Instead of wheels other movable elements such as chains or the like can be used. In this embodiment the undercarriage 24 supporting the front end 20 of the support surface 12 is driven by a motor. However, this is merely an option. It is also possible that the undercarriage 24 is arranged so as to be attached to a tractor.

In the embodiment of the present invention as shown in FIGS. 1 to 3, the support surface 12 is formed by an elbow lever 34 comprising two lever arms 36,38 hingedly connected to each other so as to pivot around a substantially horizontal pivot axis 35. At its ends 37,39, the two lever arms 36,38 are rotatably connected to the undercarriage 24 and the undercarriage 26, respectively, around horizontal pivot axes 42,44, respectively, as shown in FIG. 1. The undercarriage 24 includes a support element 43 rotatable around a vertical axis 45 and supporting the end 37 of lever arm 36. Furthermore, a driven element 46 is provided which acts on the lever arm 36 so as to rotate the same around the pivot axis 42. As an alternative, the driven element 46 could be provided at the rear undercarriage 26 and, accordingly, could act on the lever arm 38 for rotating the same around the pivot axis 44. For example, the driven element 46 could be built as a gear which is in engagement with a gear element or toothed element or portion of the lever arm 36 or 38, respectively. However, other driven elements such as those operating frictionally can be used. In general, each driven element can be used which provides rotational movement of one of the lever arms 36,38 around the pivot axes 35,42,44.

As can be seen in FIG. 2, by use of the driven element 46 the elongate rotor blade 14 can be elevated from the substantially horizontal orientation of FIG. 1 into at least one inclined orientation arranged obliquely relative to the substantially horizontal orientation. A wire or rope 48 wound or unwound by a winch 50 is provided for preventing unintentional movement of the two undercarriages 24,26 away from each other when the rotor blade 14 is in its elevated position i.e., when the two lever arms 36,38 are articulated to each other as shown in FIG. 2.

FIGS. 4 to 6 show a second embodiment of a transport device 10' according to the invention which is similar to the transport device 10 of FIGS. 1 to 3 regarding the support surface and means for elevating the rotor blade 14 provided as an elbow lever 34. Accordingly, for same elements in FIGS. 1 to 6 identical reference numerals are used.

The two embodiments of FIGS. 1 to 6 differ with respect to the engagement of the driven element 46 and the end 37 of the elbow lever arm 36. The end 37 of the lever arm 36 is provided with a toothed quarter to half circumference section 52 being in engagement with the driven element 46 which is build as a gear or the like. The diameter of the section 52 can be larger than the thickness of the lever arm 36 at its end 37 improving the transfer of the rotational forces of the driven element 46 into pivotal forces of the lever arm 36 for elevating the elbow lever 34.

In FIGS. 7 to 9 a third embodiment of a transport device 10" is shown. As far as the elements of this transport device 10" are identical or similar to the elements shown in FIGS. 1 to 6 identical reference numerals are used in FIGS. 7 to 9. In contrast to the embodiments of the transport device 10 and 10' of FIGS. 1 to 6, the transport device 10" of FIGS. 7 to 9 is provided with a hydraulic cylinder piston unit 54 for elevating a first section 56 of the support surface 12. The piston unit 54 acts between rotatable support element 43 of the undercarriage 24 and the first section 56 of the support surface 12. At the first section 64, the rotor blade 14 is mounted which rests on the first section 56 and on the rear undercarriages 24 and 26 are connected by a length-variable connecting element 58 provided as a hydraulic telescopic element for varying the length of the support surface 12. When in its horizontal orientation, the rotor blade 14 rests on the first section 56 and the distance between the front end 20 of the support surface 12 and the rear undercarriage 26 is decreased by use of the connecting element 58 (see FIG. 8) compared to the situation of FIG. 7 showing the first section 56 of the support surface 12 and the rotor blade 14 in the substantially horizontal orientation. In this embodiment, the length of the support surface can be varied independently from the degree of elevation of the rotor blade when the first section of the support surface is in an elevated orientation.

In the embodiment of FIGS. 7 to 9 the support element 43 is mounted on a rotatable support member 60 which by use of a driving unit (not shown) is rotatable around a vertical axis 62 and which carries the piston unit 54. The undercarriage 24 is provided with a rotatable carrying element 64 which carries the support element 60. The support element 60 and the carrying element 64 can be locked relative to each other (not shown but e.g. provided by blocking the driving unit mentioned above which can be mounted at the carrying element 60 and acting on the support element 43) so that both are rotatable around vertical axes 45. The support member 60 can be rotated around the vertical axis 62 relative to the carrying element 64 which can be locked relative to the undercarriage 24. Depending on the construction of the support element 43, both vertical axes 45 and 62 which in this embodiment are spaced apart, can overlay each other.

By the above-mentioned construction of the support element 43 it is possible to actively rotate the blade 14 in an inclined orientation of the first portion 56 of the support surface 12 so as to vary the azimuth position of the blade 14 relative to the undercarriages 24 and 26 of the transport device 10". This increases manoeuvrability of the blade 14 around narrow road corners.

A support element 43 with the construction of that of FIGS. 7 to 9 can also be used in the transport devices 10 and 10" provided that the linkage between the two elbow arms 36,38 allows relative movements thereof in all directions i.e. is built e.g. as a universal joint or a ball-and-socket joint.

Although the invention has been described and illustrated with reference to specific illustrative embodiments thereof, it is not intended that the invention be limited to those illustrative embodiments. Those skilled in the art will recognise that variations and modifications can be made without departing from the true scope of the invention as defined by the claims that follow. It is therefore intended to include within the invention all such variations and modifications as fall within the scope of the appended claims and equivalents thereof.

What is claimed is:

1. A transport device for a rotor blade for a wind turbine, comprising:
    a support surface for the rotor blade, comprising a front end and a rear end, wherein the front end of the support surface is closer to a front end of the transport device than a rear end of the transport device;
    a drive element to drive the rotation of the rotor blade about a pivot axis at the front end of the support surface from a substantially horizontal orientation into at least one inclined orientation arranged obliquely relative to the substantially horizontal orientation during transportation of the rotor blade, wherein the drive element is disposed at the front end of the support surface; and
    means for changing the distance between the ends of the support surface as viewed in the vertical projection of the support surface, wherein, if the rotor blade is arranged in the substantially horizontal orientation, the ends of the support surface are spaced apart a first distance value, and, if the rotor blade is arranged in the at least one inclined orientation, the ends of the support surface are spaced apart a second distance value which is smaller than the first distance value.

2. The transport device according to claim 1, wherein the means for changing the distance between the ends of the support surface comprises an elbow lever arranged to be bent about a substantially horizontal axis and including two lever arms articulated to each other, the two lever arms at least partially forming the support surface for the rotor blade, the two mutually remote ends of the lever arms forming the ends of the support surface, and the rotor blade is attachable to one of these ends of the lever arms and in all positions of the elbow lever is supported by the respective lever arm, and that the driven element for driving the rotation of the rotor blade is arranged to act on the elbow lever for changing the elbow lever orientation.

3. The transport device according to any one of claims 1 to 2, wherein the driven element is configured to elevate a portion of the support surface around a substantially horizontal axis.

4. The transport device according to claim 3, wherein the elevated portion of the support surface is rotatable around a substantially vertical axis.

5. The transport device according to any one of claims 1 to 2, wherein the rear end of the support surface has an undercarriage with wheels arranged thereon.

6. The transport device according to claim 5, wherein the wheels are steerable.

* * * * *